US007028892B2

(12) United States Patent
Morgan

(10) Patent No.: US 7,028,892 B2
(45) Date of Patent: Apr. 18, 2006

(54) EMERGENCY IDENTIFICATION POUCH WITH DNA SOURCE SPECIMEN

(76) Inventor: Carroll H. Morgan, 403 Pryor Rd., Taylors, SC (US) 29687

( * ) Notice: Subject to any disclaimer, the term of this patent is extended or adjusted under 35 U.S.C. 154(b) by 0 days.

(21) Appl. No.: 10/804,538

(22) Filed: Mar. 19, 2004

(65) Prior Publication Data

US 2004/0262403 A1 Dec. 30, 2004

Related U.S. Application Data

(63) Continuation-in-part of application No. 10/368,127, filed on Feb. 18, 2003, now abandoned.

(51) Int. Cl.
*G06K 5/00* (2006.01)

(52) U.S. Cl. ....................................... 235/380; 235/383

(58) Field of Classification Search ................ 235/380, 235/375, 382, 382.5, 381, 383; 283/74, 75, 283/77; 382/115
See application file for complete search history.

(56) References Cited

U.S. PATENT DOCUMENTS

| | | | | |
|---|---|---|---|---|
| 4,259,391 | A | 3/1981 | Brecht | 428/195 |
| 4,745,268 | A | 5/1988 | Drexler | 235/487 |
| 5,101,970 | A * | 4/1992 | Turner | 206/223 |
| 5,197,763 | A | 3/1993 | Whalen | 283/76 |
| 5,211,286 | A * | 5/1993 | Turner | 206/223 |
| 5,948,673 | A * | 9/1999 | Cottingham | 435/287.2 |
| 6,140,936 | A | 10/2000 | Armstrong | 340/825.34 |
| 6,857,210 | B1 * | 2/2005 | Santa Cruz | 40/124.06 |
| 2002/0021001 | A1 * | 2/2002 | Stratford et al. | 283/74 |
| 2003/0086591 | A1 * | 5/2003 | Simon | 382/115 |
| 2004/0160054 | A1 * | 8/2004 | Davin | 283/74 |
| 2004/0221494 | A1 * | 11/2004 | Santa Cruz | 40/124.06 |
| 2005/0059034 | A1 * | 3/2005 | Tyler et al. | 435/6 |
| 2005/0065950 | A1 * | 3/2005 | Chaganti et al. | 707/100 |

FOREIGN PATENT DOCUMENTS

| | | |
|---|---|---|
| JP | 11-216969 | * 10/1999 |

* cited by examiner

*Primary Examiner*—Thien M. Le
(74) *Attorney, Agent, or Firm*—Charles L. Schwab; Nexsen Pruet, LLC

(57) ABSTRACT

An emergency identification pouch including a sealed personal identification envelope containing a DNA source specimen. The sealed envelope is encased in a laminate sheath which may be cut open to retrieve the envelope so a DNA comparison can be made.

11 Claims, 4 Drawing Sheets

EMERGENCY IDENTIFICATION POUCH WITH DNA SOURCE SPECIMEN

This application is a continuation-in-part of U.S. application Ser. No. 10/368,127, filed Feb. 18, 2003, which is now abandoned.

BACKGROUND OF THE INVENTION

It is a common practice for individuals to carry cards which serve to identify the carrier. A driver's license is usually compact, made of plastic, and can serve to identify a person through a photograph, height and weight, hair and eye color, or other personally identifiable information.

Other types of identification cards may be available to those who cannot acquire a driver's license, such as children. These cards may be of compact size and encased in a durable plastic shell. Cards with printing on both sides may carry more information, such as an additional photograph or fingerprints. These cards do not adequately address the problem of effectively identifying a person when that person is deceased and the person's remains are damaged in such a way as to render impossible traditional visual identification, or identification through fingerprint technology. The prior art does not adequately address safeguarding a DNA specimen against contamination during production of such a card and opening of the card. The conclusive identification of deceased or missing persons through DNA comparison is important in both civil and criminal matters.

BRIEF SUMMARY OF THE INVENTION

It is an object of the present invention to provide an emergency wallet size identification pouch which contains personally identifiable information. It is another object of the invention to provide such a pouch useful in conclusively identifying a missing or deceased person. It is another object of the invention to provide an improved method for identifying individuals. These as well as other objects are accomplished by utilizing a compact envelope to preserve a DNA specimen. General personal identification information is placed on both sides of the envelope and the envelope is encased in a sheath made of laminate material such as plastic.

BRIEF DESCRIPTION OF THE DRAWINGS

The invention is illustrated in the accompanying drawings, in which.

DETAILED DESCRIPTION OF THE INVENTION

The present invention provides a wallet size emergency personal identification pouch carrying standard identifying information such as name, address, height, weight, photograph and fingerprints, as well as providing a DNA source specimen such as hair, saliva or other human fluids or tissue, of the person identified by the pouch. This DNA source specimen is matched up with the standard identifying information inserted into an envelope which is sealed and encased a laminate sheath to form a pouch so there can be no doubt about whose DNA it is. By so encasing the hair strands or saliva on paper, for instance, not only is the identity of the person whose DNA is present in the hair or saliva preserved, but the integrity of the hair or saliva is also preserved.

The present invention is advantageous to both the holder of the identification pouch and to any person who may need to utilize the pouch to ascertain the identity of an individual by comparing the DNA of the pouch specimen to the DNA of a source specimen found elsewhere. There exists a predetermined broken line along which the laminate sheath may be cut, thereby permitting access to the hair or saliva sample, should the need arise.

Figure 1:
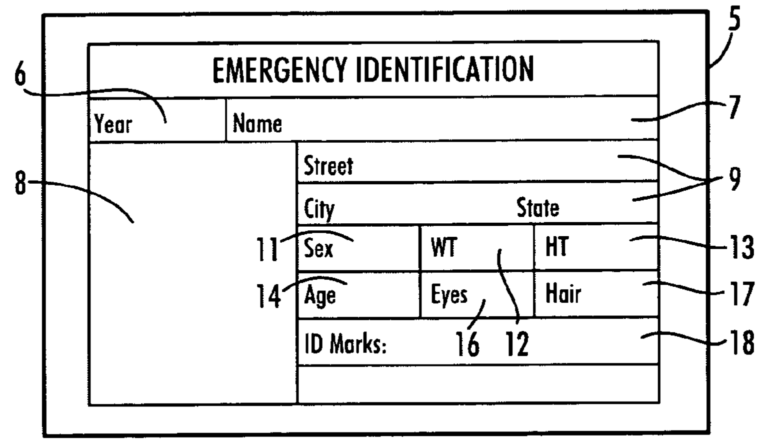
FIG. 1 is a front view of an emergency identification envelope.
Figure 2:
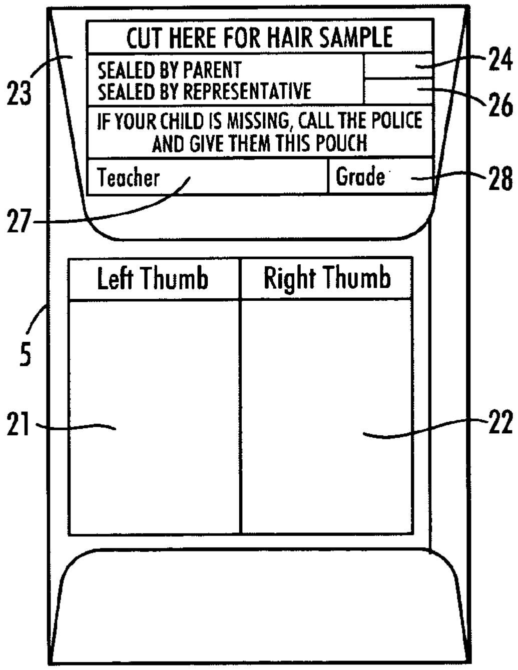
FIG. 2 is a rear view of the emergency identification envelope.

Referring FIGS. 1 and 2, the envelope 5 contains fields or spaces for personal identification data on the front and back sides thereof. The front, displaced in FIG. 1, has a space 6 for the year in which the pouch was created, a space 7 for the identified person's name and a space 8 for that persons photograph. It also contains spaces 11, 12, 13, 14, 16, 17, 18 for the identified person's sex, weight, height, age, eye color, hair color, and distinguishing marks, respectively. Referring to Figure, the rear of the envelope 5 includes a space 21 for a left thumb print and a space 22 for a right thumb print of the person identified on the front of the envelope 5. The flap 23 of the envelope 5 includes a space 24 for the initials of the identified person's parent who seals the envelope and a space 26 for the initials of the representative who seals the envelope. Also included on the flap 23 is a space 27 for the teachers name and a space 28 for the school grade of the identified individual. The information on the envelope 5 may be in multiple languages.

Figure 3:
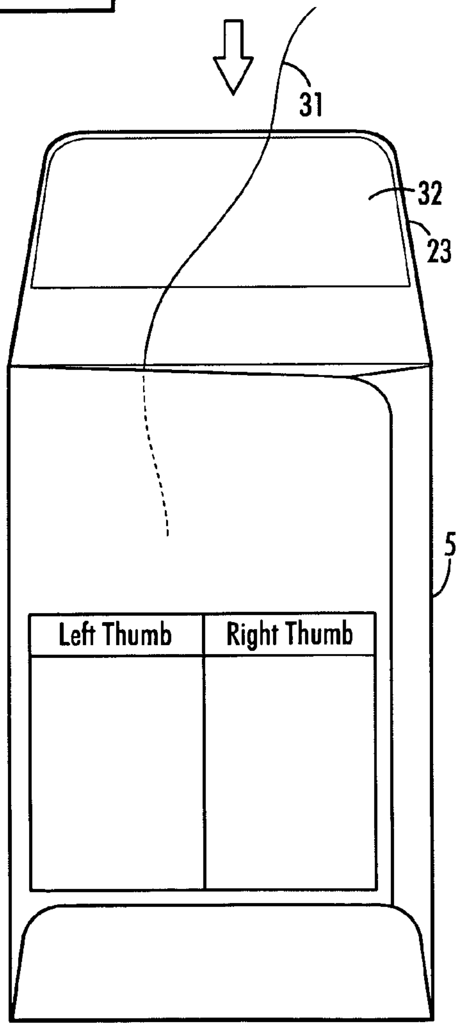
FIG. 3 shows a hair being inserted into the envelope.

Referring to FIG. 3 the flap 23 has been opened and a DNA specimen in the form of a hair 31 is being inserted into the interior of the envelope 5. After the hair 31 has been inserted an adhesive area 32 on the underside of the flap 23 is moistened and the flap is folded to a closed position, as shown in FIG. 2, in which the envelope safely encloses the DNA specimen 31. The adhesive area 32 may be a gummed area covered by a removable waxed paper, in which case the flap 23 is closed and sealed after removal of the waxed paper.

Figure 4:
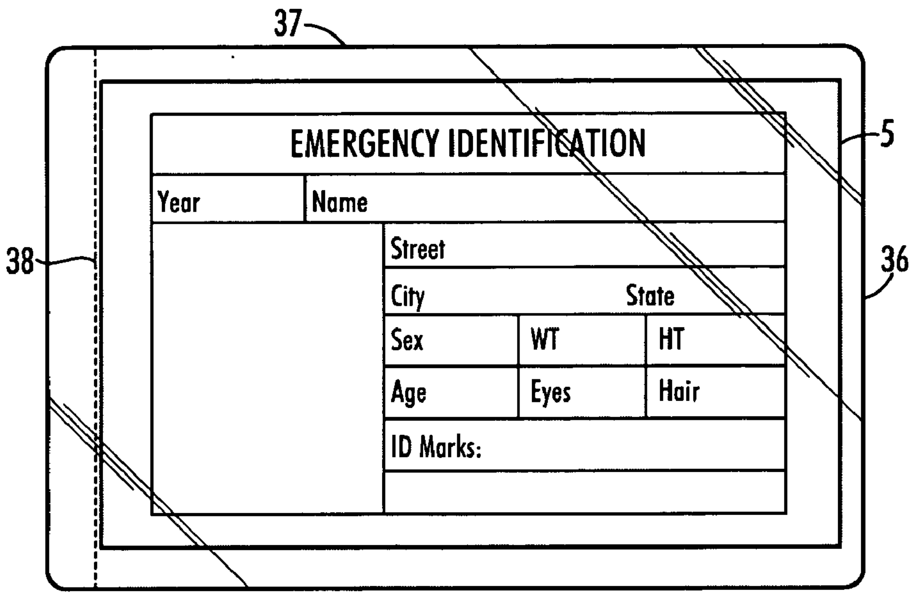
FIG. 4 is a front view of the envelope in a laminate sheath.
Figure 5:
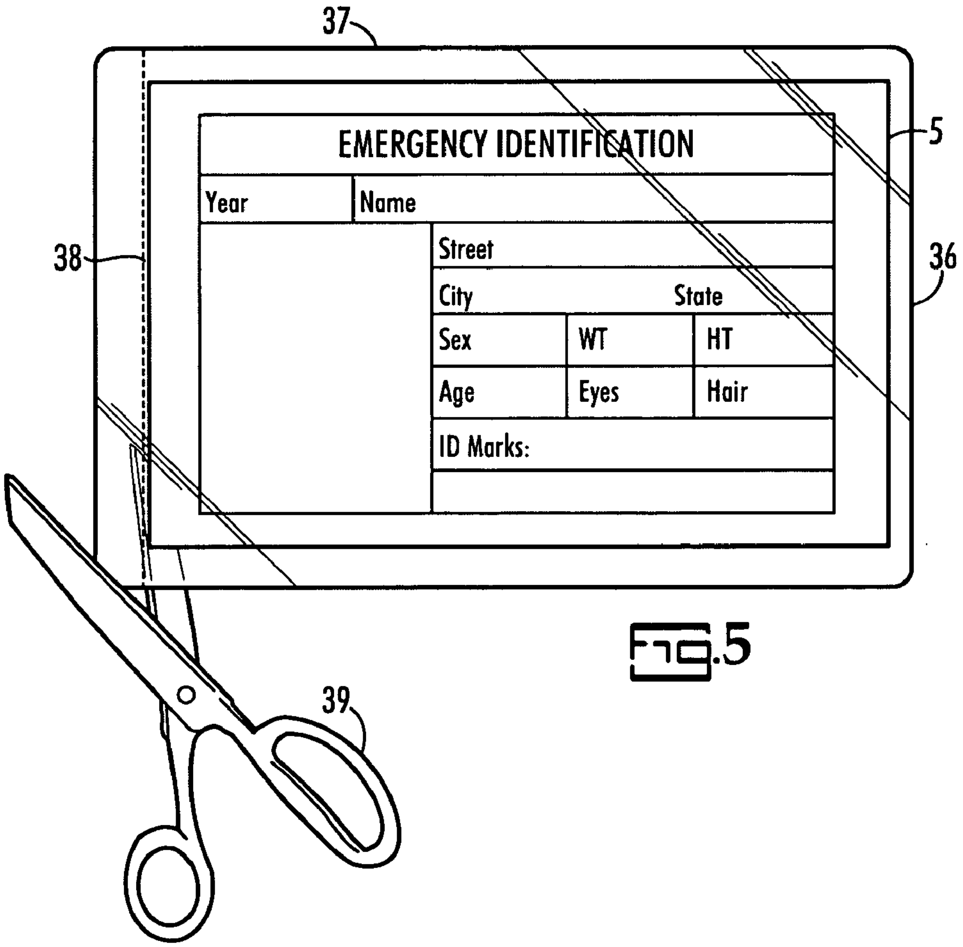
FIG. 5 illustrates cutting of one end of the laminate sheath.
Figure 6:
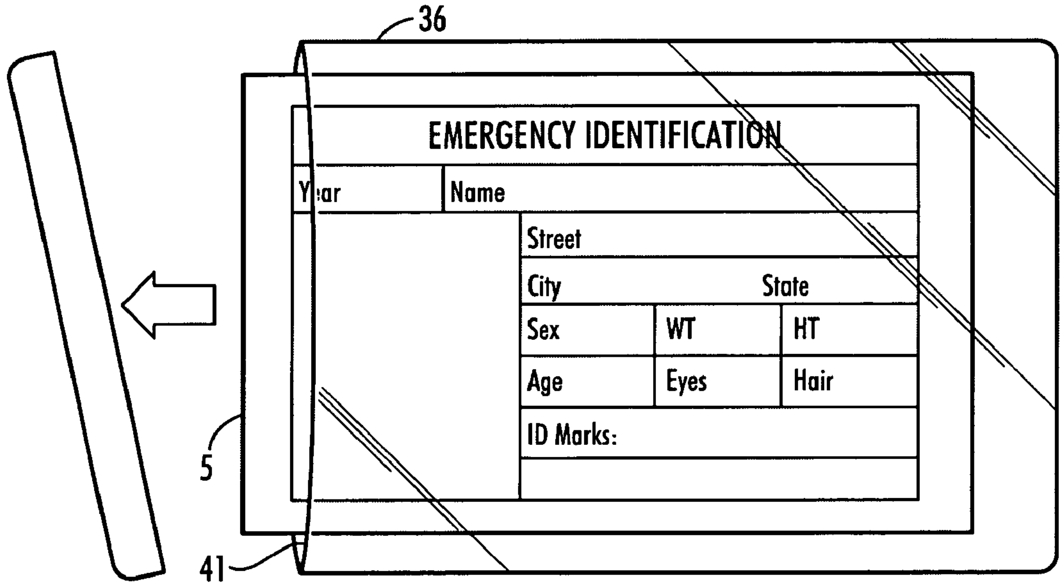
FIG. 6 illustrates removal of the envelope from the laminate sheath.

FIG. 4 shows the closed envelope 5 sealed in a plastic sheath 36 to form a laminated wallet size pouch 27. The plastic sheath includes a marking or broken line 38 on which the plastic sheath 36 can be cut to remove the identification envelope 5. FIG. 5 shows the sheath 36 being cut on the marking or broken line 38 by a scissors 39. FIG. 6 shows the envelope 5 being removed from the cut sheath 36 by way of the opening 41 formed by the cut. After removal of the envelope, the envelope 5 may be cut across its flap end, as directed by the notation on the flap 23 appearing in FIG. 2, to remove the DNA specimen from the envelope.

Figure 7:
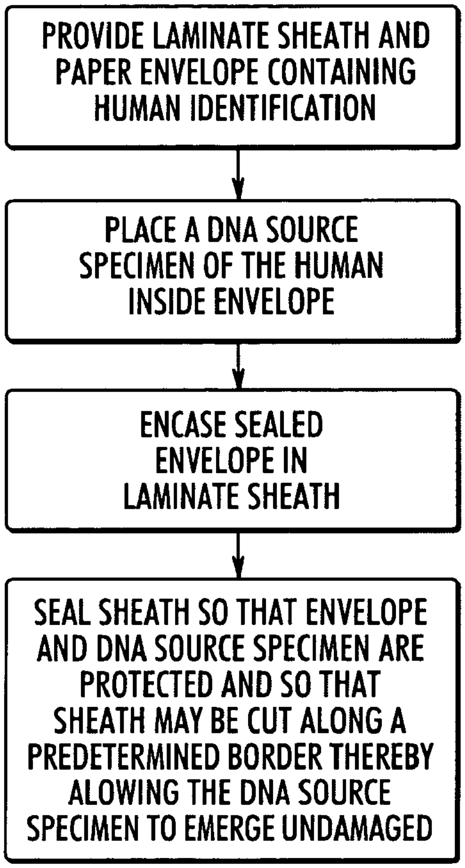
FIG. 7 is a flow chart illustrating a method of making an emergency identification pouch with a DNA source specimen.

FIG. 7 illustrates the process of making the emergency identification pouch of this invention. An envelope 5 containing field descriptions and information descriptive of a human being and a laminate sheath is provided. A DNA source specimen from the person identified by the envelope is gathered and placed in the envelope 5. The DNA source specimen is preferably in the form of one or more human hairs and/or saliva on a small piece of paper. The envelope 5 is sealed and placed inside a laminate sheath 26 so that both sides of the card are visible through the clear laminate, then the sheath is sealed so that the envelope and the DNA source specimen are protected from damage. The sheath may be cut on the broken line 38 thereby releasing the DNA source specimen for use in human identification.

Figure 8:
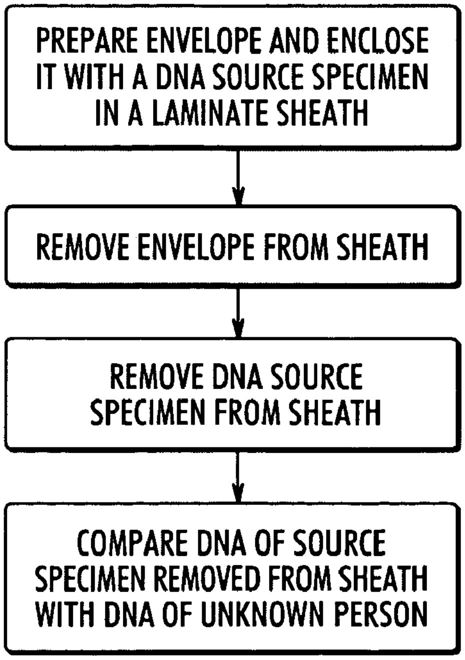
FIG. 8 is a flow chart illustrating a process of using the emergency identification pouch to identify a human being.

FIG. 8 illustrates the process of using the emergency identification pouch 37 of this invention. First, the identification envelope 5 is prepared, the DNA source specimen is placed in the envelope and the sealed envelope is encased in the laminate sheath 36. When an unidentifiable body is found which is suspected of being the person identified by the card, the DNA source specimen is removed from the sheath 36 by cutting along the broken line 38 permitting removal of the specimen through the opening 41. The DNA source specimen is removed and compared to a DNA source specimen of an unidentified body, which results in a virtual 100% confirmation of whether the unidentifiable body is in fact the person identified by the envelope. Another situation in which the pouch would prove useful is when the person identified by the envelope is missing, and latent evidence such as hair, blood, or other bodily fluid or tissue containing DNA is found which potentially belongs to the person identified by the envelope. The DNA source specimen inside the sheath may be removed and used for comparison to the DNA present in the latent evidence.

Although the present invention has been described in detail, it should be understood that the pouch and the methods described herein and illustrated in the drawings are subject to other advantages and modifications that may be apparent to those of ordinary skill in the art without departing from the spirit and scope of the appended claims. Accordingly, the invention is to be limited only by the scope of the following claims and their equivalents.

What is claimed is:

1. An emergency wallet size identification pouch comprising:

a paper envelope with information on the front and back sides thereof including name, address, sex, photograph and fingerprints descriptively identifying a human;

a DNA source specimen of said human in said paper envelope, said paper envelope being sealed, and a clear laminate sheath encasing said envelope, said sheath being a sealed enclosure.

2. The emergency identification pouch of claim 1, wherein said DNA source specimen may be removed from said paper envelope upon said sheath being cut at a predetermined end thereof.

3. The emergency identification pouch of claim 1, wherein information identifying said human is legibly imprinted in multiple languages on said envelope.

4. The emergency identification pouch of claim 1 wherein said DNA source specimen is hair of said human.

5. The emergency identification pouch of claim 1 wherein said DNA source specimen is saliva of said human.

6. The emergency identification pouch of claim 1 wherein said clear laminate sheath has a marking along which it may be cut to permit extraction of said envelope from said sheath.

7. A method for making a wallet size emergency identification pouch comprising:

placing information on a sealable paper envelope descriptive of an individual human including name address, sex, photograph and fingerprints of said human;

placing a DNA source specimen of said human in said envelope, sealing said envelope, encasing said sealed envelope in a clear laminate sheath and sealing said sheath.

8. The method of claim 7 wherein said DNA source specimen is hair of said human.

9. The method of claim 7 wherein said DNA source specimen is saliva of said human.

10. The method of claim 7, further comprising providing a marking on said sheath along which said sheath may be cut to facilitate the extraction of said envelope from said laminate sheath.

11. The method of claim 7, further comprising printing identification information on said envelope in multiple languages.

* * * * *